United States Patent [19]
Shrinkle

[11] Patent Number: 5,608,583
[45] Date of Patent: Mar. 4, 1997

[54] SYSTEM FOR QUALIFYING THE DETECTION OF A SERVO DIBIT

[75] Inventor: Louis J. Shrinkle, Leucadia, Calif.

[73] Assignee: Conner Peripherals, Inc., San Jose, Calif.

[21] Appl. No.: 448,806

[22] Filed: May 24, 1995

[51] Int. Cl.⁶ .............................. G11B 5/09; G11B 5/596
[52] U.S. Cl. ......................................... 360/46; 360/77.08
[58] Field of Search .................................. 360/46, 77.08, 360/31, 53

[56] References Cited

U.S. PATENT DOCUMENTS

| | | | |
|---|---|---|---|
| 4,564,870 | 1/1986 | Kitamura | 360/46 X |
| 4,626,933 | 12/1986 | Bucska et al. | 360/46 X |
| 4,751,591 | 6/1988 | Fujimoto | 360/46 |
| 4,760,472 | 7/1988 | Minuhin et al. | 360/46 |
| 4,774,601 | 7/1988 | Ouchi et al. | 360/46 |
| 5,383,064 | 1/1995 | Harman | 360/45 |
| 5,420,726 | 5/1995 | Mathews et al. | 360/46 |

OTHER PUBLICATIONS

"Performance Degradation of PRML Channels Due to Nonlinear Distortions", Pablo A. Ziperovich, *IEEE Transactions on Magnetics*, vol. 25, No. 5, Nov. 1991, pp. 4825–4827.

"Integrating a Partial Response Maximum Likelihood Data Channel into the IBM 0681 Disk Drive", J. C. Coker et al., *Proceedings of the Asilomar Conference on Signals, Systems and Computers*, Nov. 1990, pp. 674–677.

"Error rate performance of experimental gigabit per square inch recording components", T. D. Howell et al., *IEEE Transactions on Magnetics*, vol. 26, No. 5, Sep. 1990, pp. 2298–2302.

"Error Injection Method for Testing Error Recovery Procedures", *IBM Technical Disclosure Bulletin*, Jan. 1990, vol. 33, No. 4, pp. 345/346.

*Primary Examiner*—W. C. Kim
*Attorney, Agent, or Firm*—Kinney & Lange, P.A.

[57] ABSTRACT

A circuit is described to detect and qualify a dibit signal, wherein the dibit signal includes a first peak amplitude followed by a second peak amplitude. The circuit includes a first qualification circuit that receives the signal and operates to detect and qualify the first peak amplitude of the dibit signal. The first qualification circuit also operates to assert an enable signal upon qualification of the first peak amplitude. A second qualification circuit is coupled to the first qualification circuit to receive the enable signal. The second qualification circuit operates to output an output signal representative of the dibit signal upon a second peak amplitude of the dibit signal only when the enable signal is asserted by the first qualification circuit.

18 Claims, 7 Drawing Sheets

DIBIT DETECTOR

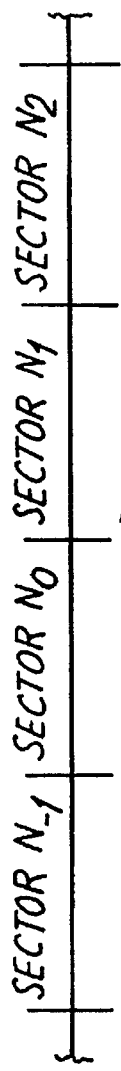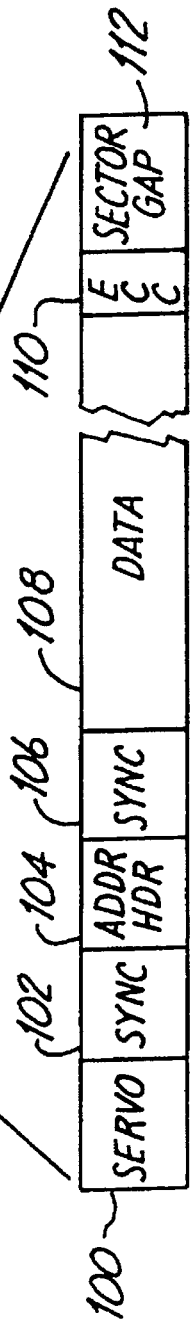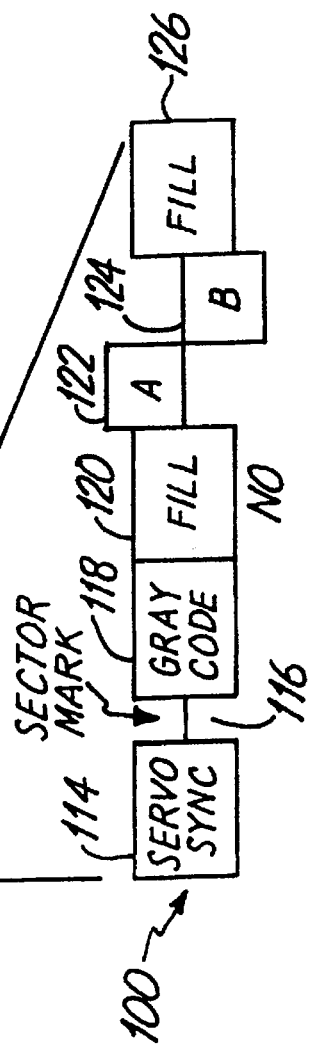

SYSTEM FOR QUALIFYING THE DETECTION OF A SERVO DIBIT

FIELD OF THE INVENTION

The present invention is directed to disk drives. More particularly, the present invention provides a new and improved qualification circuit for use in detecting a servo dibit.

BACKGROUND OF THE INVENTION

Disk drives are commonly used in workstations, personal computers, laptops and other computer systems to store large amounts of data in a form that are readily available to a user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface.

A head includes an interactive element, such as a magnetic transducer, that is used to sense the magnetic transitions to read data, or to conduct an electric signal that causes a magnetic transition on the disk surface, to write data. The magnetic transducer includes a read/write gap that positions the active elements of the transducer at a position suitable for interaction with the magnetic transitions on the surface of the disk, as the disk rotates.

As known in the art, the magnetic transducer is mounted by the head to a rotary actuator arm and is selectively positioned by the actuator arm over a preselected data track of the disk to either read data from or write data to the preselected data track of the disk, as the disk rotates below the transducer. The head structure includes a slider having an air bearing surface that causes the transducer to fly above the data tracks of the disk surface due to fluid currents caused by rotation of the disk.

Whenever data are either written to or read from a data track, the transducer gap of the head must be centered over the centerline of the magnetic transitions of the data track where the data are to be written or from where the data are to be read, to assure accurate transduction of the transitions representing data. If the head is off-center, the head may transduce transitions from an adjacent track. A servo system is typically used to control the position of the actuator arm to insure that the head is properly centered over the magnetic transitions during either a read or write operation. In a known servo system, servo position information is recorded on the disk surface between written data blocks, and periodically read by the head for use in controlling the position of the actuator arm. Such a servo arrangement is referred to as an embedded servo system.

In modern disk drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors, as is well known.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

In addition to the bursts of magnetic transitions straddling the centerline, each servo sector contains an Address Mark (AM) field and a Gray code field. The AM field is an asynchronous, absolute timing reference that identifies the beginning of a servo sector and provides the basis for locating the other fields of the servo sector, including the positioning bursts discussed above. The Gray code field contains coded information that indicates the track number where the servo sector is located. This information is used to determine the radial position of an actuator during, e.g. a seek operation to locate a particular data sector, by providing a unique identification for each data track on the respective disk surface.

As should be understood, the reliability of servo signal detection is a significant concern to disk drive designers. In order to insure that the servo sectors are properly processed, the AM field must be precisely and reliably detected to accurately locate the Gray code field and servo bursts for head track location and centerline position control. The Gray code field must also be precisely detected for a definitive indication of radial location.

To that end, the AM and Gray code fields of each servo sector are typically recorded as a series of dibits. The magnetic transitions on a disk surface have a certain magnetic polarity, i.e., a north pole or a south pole. A dibit utilizes adjacent pairs of alternating north pole/south pole transitions. When transduced by a head, a dibit results in two electrical peaks having a predetermined relationship to one another as a function of the spacing of opposite magnetic polarity transitions. The electrical peaks comprise a positive electrical peak followed by a negative electrical peak, or vice versa. Advantage can be taken of the dibit detection because specific peak pair detections, such as a positive peak followed after a certain time by a negative peak, can be more accurately distinguished from random single peaks caused by noise in the system.

Disk drives typically include a qualification circuit that receives signals transduced by a head. The qualification circuit compares the strength of each signal peak to a threshold value and provides an output indicative of detection of a transition when a detected signal peak at least equals the threshold value. In this manner, only peaks most likely indicative of data stored on the disk surface are passed through the disk drive for processing. False peaks caused by noise in the circuit are generally of a magnitude below the threshold value, and are not passed through to the disk drive. The same qualification circuit is ordinarily used to qualify detected transitions representing both data and servo information such as AM and Gray code field information.

A shortcoming of present day disk drives is that circuitry utilized to qualify single signal peak detections does not separately qualify a dibit. In other words, the circuitry is designed to qualify each separate peak without regard to a relationship to another peak as exists in a dibit arrangement. Accordingly, a detected peak that exceeds the threshold value is output by the qualification circuit regardless of whether the single peak is meant to be servo information encoded as a dibit.

Such an arrangement degrades the accuracy of dibit detection because the dual peaks are not separately qualified. Each single strong false peak can be passed to the servo system and incorrectly detected as AM or Gray code information. As should be understood, the inclusion of false peak information in a servo operation renders the AM and Gray code detections inaccurate, resulting in false position control.

SUMMARY OF THE INVENTION

The present invention provides a new and improved qualification circuit that can qualify individual peaks and dibit peak pairs. Generally, the present invention provides a first peak qualification circuit having an output coupled as an enable signal to a second peak qualification circuit. The output of the second peak qualification circuit provides raw servo data for processing in a servo operation only when it is enabled by the first peak qualification circuit.

As indicated, when the first peak qualification circuit qualifies a detected peak, an output is transmitted to the second peak qualification circuit to enable that circuit. A subsequent peak transduced by the head will be qualified and output by the second peak qualification circuit as a signal representing a dibit. If a second peak is not detected, no output is provided to the servo system.

In accordance with a feature of the present invention, a logic circuit can be utilized to couple the first and second peak qualification circuits to one another. The logic circuit can be arranged to permit a dibit output only when certain conditions are met. For example, a dibit may comprise a positive peak followed by a negative peak. The logic circuit can inhibit an output from the second peak qualification circuit if, after qualification of a first positive peak by the first qualification circuit, a subsequent peak is also positive.

Thus, the present invention improves the accuracy of servo processing by qualifying dibit detections. False single peaks are effectively filtered out of raw servo signals transduced by a head in a disk drive, and qualified servo signals more accurately reflect AM and Gray code information recorded on disk surfaces for control of head position in data read and write operations.

BRIEF DESCRIPTION OF THE DRAWINGS

FIGS. 3a–c present a diagrammatic explosion of the format and constituency of a representative data sector as recorded within the data tracks of the disks of the disk drive of FIG. 1.

DETAILED DESCRIPTION

Figure 1:
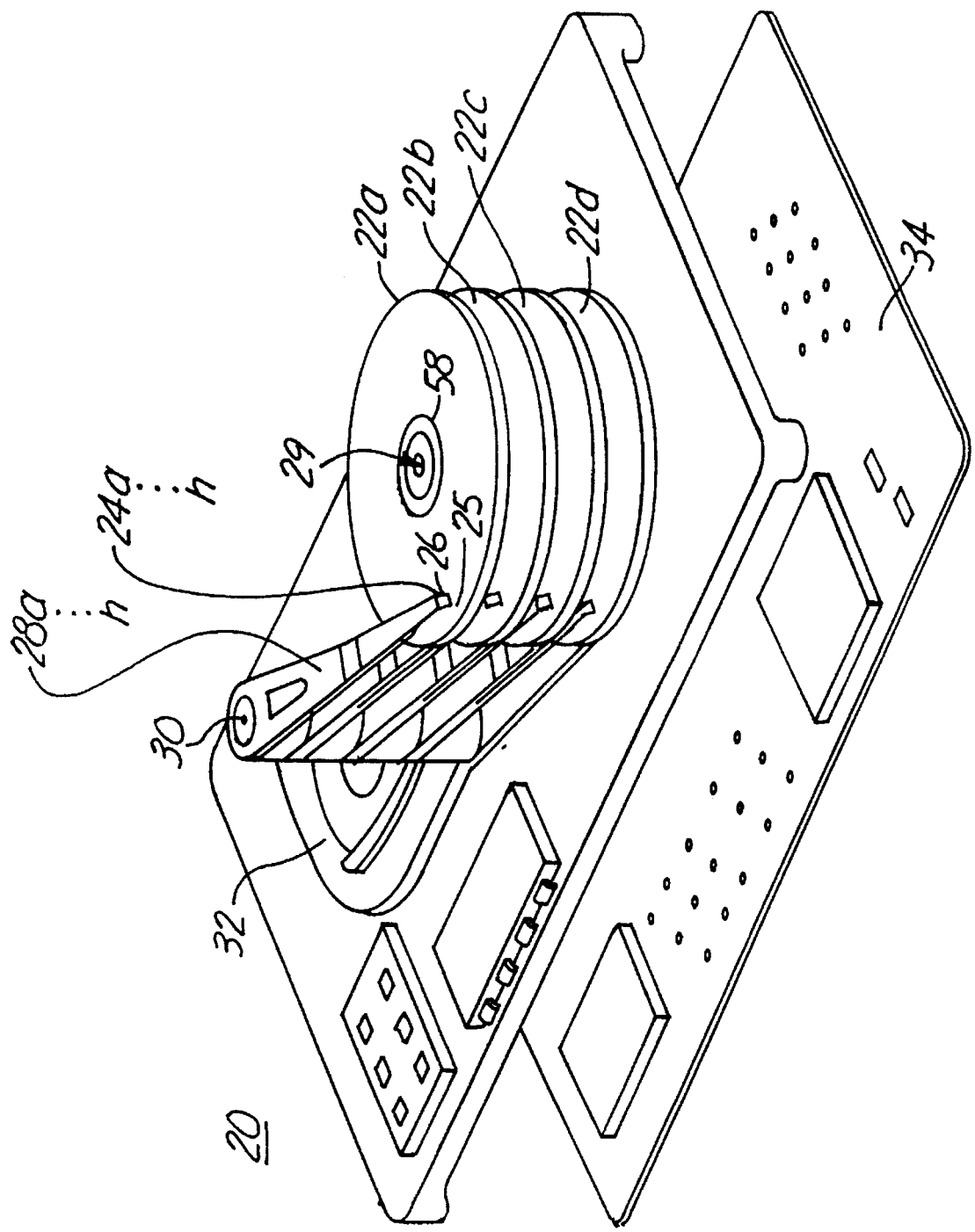
FIG. 1 is perspective view of an exemplary disk drive.

Referring now to the drawings, and initially to FIG. 1, there is illustrated an example of a disk drive designated generally by the reference numeral 20. The disk drive 20 includes a stack of storage disks 22a–d and a stack of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads is mounted to a respective actuator arm 28a–h by a flexure element (not shown) and comprises a magnetic transducer 25 mounted to a slider 26 having an air bearing surface (not shown), all in a known manner. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
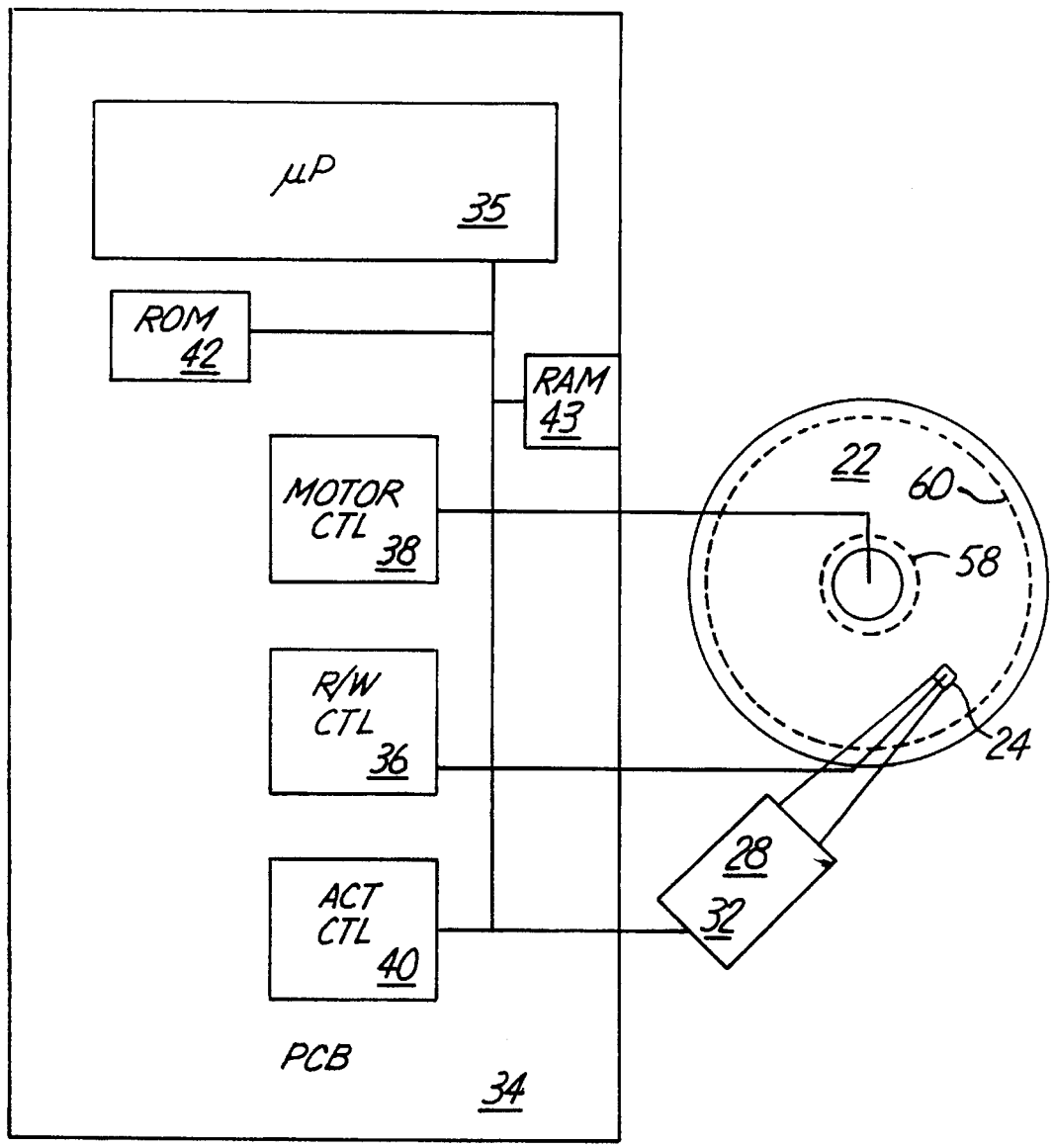
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are input to the read channel of the read/write control 36 for processing. The RAM 43 can be used to buffer data read from or to be written to the data sectors of the storage disks 22a–d via the read/write control 36. The buffered data can be transferred to or from a host computer utilizing the disk drive for data storage.

Referring now to FIGS. 3a–c, there is illustrated an exploded diagram showing the format and constituency of a representative data sector of one of the data tracks of the disks 22a–d. FIG. 3a represents a portion of a sequence of data sectors recorded in the form of magnetic transitions within the radial extent of the data track. The data sectors are labeled $N_{-1}$, $N_0$, $N_1$ and $N_2$. The sequence of data sectors extends around the entire circumferential length of the data track.

FIG. 3b is an exploded view of the data sector $N_0$. The data sector $N_0$ is divide into a number of fields. The left most field comprises a servo sector field 100 that contains servo position information, as will be described in more detail in respect of FIG. 3c. The servo field 100 is followed by a sync field 102 containing recorded magnetic transitions that are used to synchronize the read and write electronics of the read/write control 36 to the frequency of magnetic transitions recorded on the disk surface in the following field.

Following the sync field 102 is an address header field 104 that contains magnetic transitions representing unique identification information for the specific data stored in the data sector $N_0$. In this manner, the disk drive system can locate and verify the exact data sector for any particular block of data that a host computer may require in a read operation. Another sync field 106 follows the address header field 104.

Actual data are stored in the next data field 108, which is followed by an error correcting field 110. The error correcting field 110 includes magnetic transitions representing information that is redundant of the data recorded in the data field 108. The error correcting information is used by the read/write control 36 to detect and correct errors that might occur during a read operation, using known error correcting techniques. A sector gap 112 follows the error correcting field 110 to physically separate the data sector $N_0$ from the following data sector $N_1$.

Referring now to FIG. 3c, each servo sector field 100 comprises position information that is used to control the radial position of the actuator arms 28a–h, e.g., during a read operation. A servo sync field 114 is used to synchronize the read and write electronics of the read/write control 36 to the frequency of magnetic transitions representing position information within the servo field 100. A sector or address mark 116 comprises recorded dibit transitions or a lack of transitions for a certain circumferential segment, that are used by the read/write control electronics to determine the beginning of the servo sector. The read/write control electronics uses the sector mark 116 to time the beginning of processing of electric signals transduced by the head form the various fields of the servo sector, as will now be described.

A Gray code field 118 follows the sector mark 116. The Gray code field 118 contains coded information that indicates the track number where data sector $N_0$ is located. This information is used to determine radial position during a seek operation, as described above, by providing a unique identification for each data track on the respective disk surface. The Gray code field 118 is also recorded as dibit transitions and is followed by a fill field 120 to separate the Gray code from the remaining servo field information comprising an A burst 122 and a B burst 124.

As illustrated in FIG. 3c, the A and B bursts are arranged to straddle the centerline of the data sector $N_0$, with the A burst 122 positioned above the centerline, as shown in the example of FIG. 3c, and the B burst 124 positioned below the centerline. Each of the A and B bursts comprises a series of magnetic transitions. The transitions of the A and B bursts of the data sector $N_0$ are transduced by a corresponding head 24a–h, as the disk rotates.

The width of the head 24a–h positioned above the data sector $N_0$ is approximately equal to the radial extent or width of the sector. As discussed, during a read operation, the head 24a–h must be centered over the sector $N_0$ to properly transduce only magnetic transitions of the sector $N_0$ into corresponding electric signals. If the head 24a–h is off-center, the head 24a–h may begin to sense transitions from data sectors of an adjacent track, resulting in an incorrect data read or write.

During operation of the disk drive, the disk drive electronics times the rotation of the disk from the detection of the address mark 116 to locate the additional fields of the data sector $N_0$. Each time a head 24a–h is over a pair of A and B bursts, the transitions transduced by the head 24a–h are processed to effectively sum all of the signals from the A burst 122, sum all of the signals from the B burst 124, and subtract one of the sum values from the other to obtain a subtraction result comprising a difference value. When the head 24a–h is properly position over the centerline, the difference value is zero. When the difference value is non-zero, that indicates that the head 24a–h is off-center.

For example, if the head 24a–h is completely off-center, above the centerline shown in FIG. 3c, the head 24c will transduce all of the transitions of the A burst 122, but none of the transitions of the B burst 124. The difference value will equal the sum of the transitions of the A burst 122 since the B burst sum will have a zero value. This result signals the microprocessor 35 to control the actuator arm 28a–h, via the actuator control 40, to move the head 24a–h toward the centerline, until the difference value is again zero.

Figure 4:
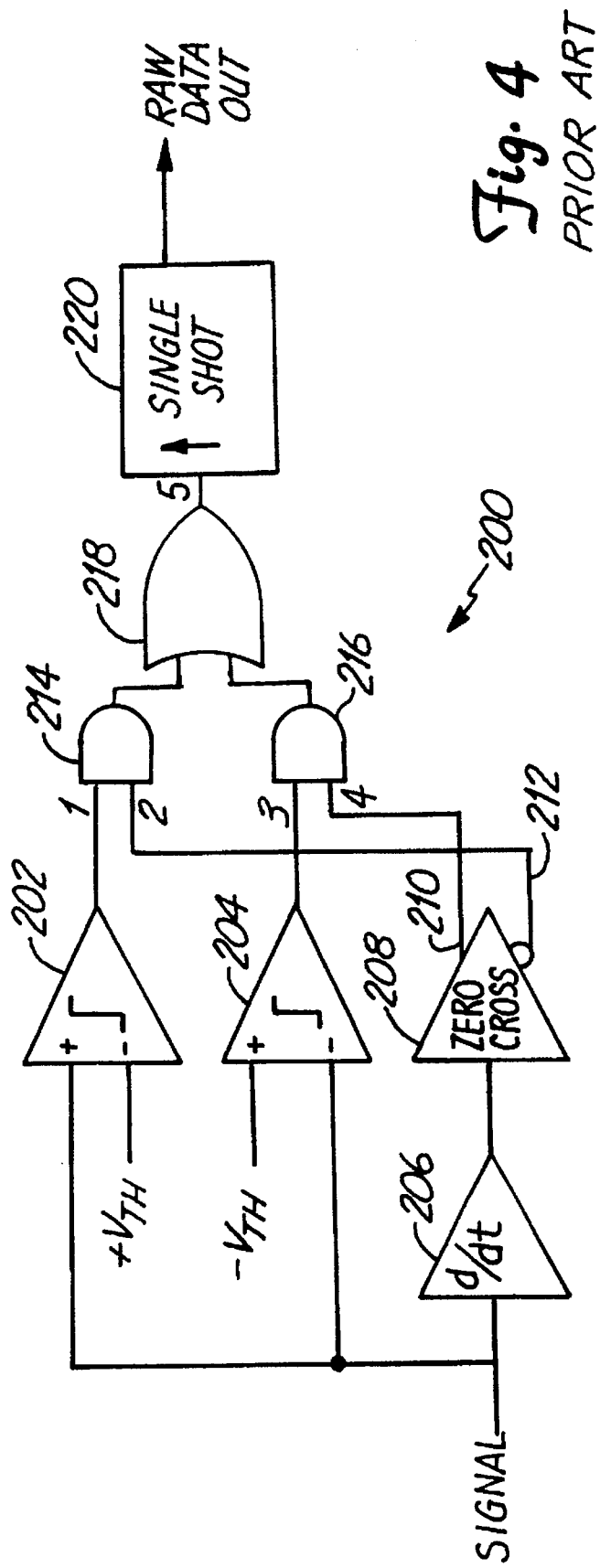
FIG. 4 is block diagram of a prior art pulse qualification circuit, in the read/write control of FIG. 2.

In order to maximize the accuracy of track location and position control, a qualification circuit is used to qualify the dibits comprising the sector mark 116 and Gray code field 118 as these transitions are transduced by the head 24a–h and transmitted to the read/write control 36. FIG. 4 shows a qualification circuit 200 of the type typically used in modern disk drives. A signal transduced by the head 24a–h, after pre-amplification, is input to the qualification circuit 200. As shown in FIG. 4, the qualification circuit 200 includes a pair of differential amplifiers 202, 204, each utilized as a comparator.

To that end, differential amplifier 202 includes a positive input and a negative input. A positive threshold voltage, $+V_{TH}$, is applied to the negative input of the amplifier 202. The signal derived from the transduction of AM and gray code transitions by the head 24a–h, is applied to the positive input of the amplifier 204. The voltage $+V_{TH}$ is set at a positive amplitude value suitably above the positive amplitudes of noise signals ordinarily found in disk drive circuits, to distinguish positive peaks associated with transduction-derived signals, from false positive peaks associated with noise. During operation, the differential amplifier 202 will only provide an output signal (point 1 in FIG. 4; signal 1 in the timing diagram of FIG. 5) when a positive amplitude of the signal applied to the positive input exceeds the amplitude of the voltage $+V_{TH}$.

Similarly, differential amplifier 204 includes a positive input and a negative input, with a negative threshold voltage, $-V_{TH}$, applied to the positive input of the amplifier 204, and the transduction-derived signal applied to the negative input of the amplifier 204, in parallel to application of the signal to the positive input of the amplifier 202. In this case, the differential amplifier 204 only provides an output signal (point 3 in FIG. 4; signal 3 in the timing diagram of FIG. 5) when a negative amplitude of the signal applied to the negative input exceeds the amplitude of the voltage $-V_{TH}$.

In this manner, only signals having a predetermined minimum amplitude, either positive or negative (as measured relative to the $+V_{TH}$ and $-V_{TH}$ voltage values), are qualified to be passed through to the read/write control 36 via one or the other of the differential amplifiers 202, 204. Of course, circuit parameters within the disk drive are designed so that signals transduced from magnetic transitions representing data or servo information will result in transduced signals, after pre-amplification, that have peak amplitudes that exceed the $+V_{TH}$ and $-V_{TH}$ voltage values, while signals associated only with noise will ordinarily not have peak amplitudes that exceed the $+V_{TH}$ and $-V_{TH}$ voltage values.

Figure 5:
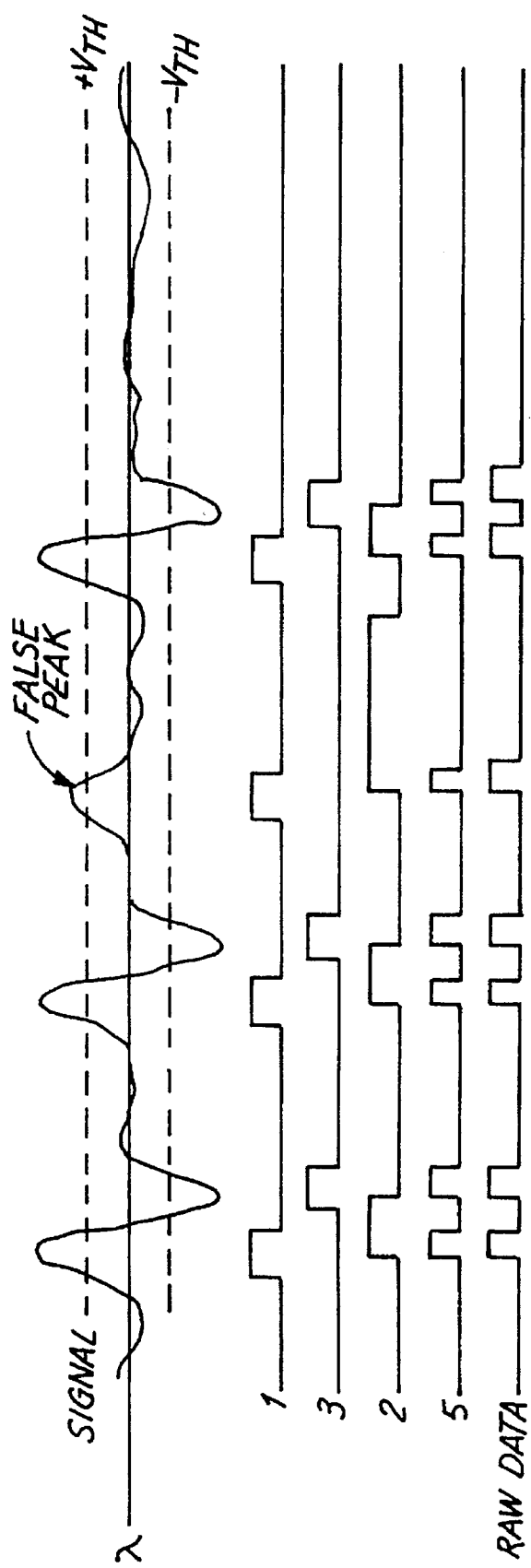
FIG. 5 is a timing diagram illustrating signals relevant to the operation of the pulse qualification circuit of FIG. 4.

Signal a of FIG. 5 represents a transduction-derived signal having a waveform of a type that could be transduced by a head 24a–h, when the head 24a–h is over either an AM or Gray code field. From left to right, the signal shows two dibits, each comprising a positive peak in the signal followed by a negative peak. After the two dibits, a single false positive peak is shown, followed by another dibit. Signal a is input to the qualification circuit 200. The signal is shown with dashed lines representing the positive and negative amplitudes of the $+V_{TH}$ and $-V_{TH}$ voltage values.

As noted above, signal 1 represents the output of the amplifier 202 relative to signal a. As shown in FIG. 5, amplifier 202 provides an output pulse during the time the amplitude of signal a is above the amplitude of $+V_{TH}$. Signal 3 represents the output of the amplifier 204 relative to signal a. As shown in FIG. 5, amplifier 204 provides an output pulse during the time the amplitude of signal a exceeds the amplitude of $-V_{TH}$.

In addition to signal a having an amplitude above certain threshold values before qualification, the signal must also be at a transient peak value corresponding to a magnetic transition sensed by a head. Thus, the qualification circuit must also determine when a particular amplitude of signal a is a peak amplitude. To that end, a differentiator circuit 206 receives the transduction-derived signal a in parallel with the application of signal a to the differential amplifiers 202, 204. The differentiator 206 determines the change in amplitude of signal a as a function of time and provides an electrical signal output that corresponds to the sign of the slope of signal a at any one time.

Slope represents the difference in value of the amplitude of signal a at any two different times. When signal a is increasing in amplitude toward a positive peak value, the slope is positive since each succeeding amplitude increases with time. At the peak positive value, the slope goes to zero and then turns negative as succeeding values for subsequent amplitudes of signal a decrease in time once past the positive peak. When signal a reaches a negative peak amplitude, the slope again goes to zero and then turns positive as signal a begins to increase in amplitude toward a next positive peak amplitude, and so on.

An output of the differentiator circuit 206 is coupled to an input of a zero cross circuit 208 that utilizes the slope sign information to determine when the transduction-derived signal a has changed slope from a positive value to a negative value or vice versa. As shown in FIG. 4, the zero cross circuit 208 includes two outputs. One output 210 provides a signal indicating a slope zero crossing from a negative slope to a positive slope, as would occur when signal a passes through a negative peak. The other output 212 is a negated version of the output 210, to indicate an opposite zero crossing, i.e. when the slope passes through a zero crossing from a positive slope to a negative slope, as would occur when signal a passes through a positive peak.

Signal 2 of FIG. 5 plots the negated output 212, in relation to signal a. Each time the slope of signal a passes through a positive peak, the slope changes from positive to negative, and output 212 goes high. Output 212 remains high until signal a passes through a negative peak (when the slope changes from negative to positive). Output 210 (signal at point 4 of FIG. 4) provides a signal that is the inverse of output 212.

AND gates 214 and 216 provide logic circuit elements to determine when both conditions of signal amplitude that exceeds either one of the $+V_{TH}$ and $-V_{TH}$ voltage values, and a peak exist. AND gate 214 is provided for qualification of a positive peak. AND gate 214 includes two inputs, one connected to the Output of amplifier 202 (signal 1, representing the first condition for a positive peak) and the other connected to the negated output 212 (signal 2, representing the second condition) of the zero cross circuit 208. When the amplitude of signal a exceeds the amplitude of $+V_{TH}$, causing an output pulse from amplifier 202, and the negated output 212 is asserted high due to a slope zero crossing from a positive slope to a negative slope, AND gate 214 provides a pulse output.

AND gate 216 includes two inputs relating to the conditions for a negative peak. The first input is connected to the output of amplifier 204 (signal 3, representing the first condition for a negative peak) and the other input connected to the output 210 (signal 4, representing the second condition) of the zero cross circuit 208. When the amplitude of signal a exceeds the amplitude of $-V_{TH}$, causing an output pulse from amplifier 204, and the output 210 is asserted high due to a slope zero crossing from a negative slope to a positive slope, AND gate 216 provides a pulse output.

Accordingly, the logic circuit comprising the amplifiers 202, 204, zero cross circuit 208 and AND gates 214, 216, operates to cause the assertion of an electric pulse whenever a peak having an amplitude that exceeds $+V_{TH}$ or $-V_{TH}$ is reached in signal a. An OR gate 218 includes two inputs, one connected to the output of AND gate 214 and the other connected to the output of AND gate 216. OR gate 218 provides an output pulse whenever a pulse is output by either AND gate 214 or AND gate 216. The output of OR gate 218 is coupled to the input of a SINGLE SHOT circuit 220. The SINGLE SHOT circuit 220 outputs a pulse of predetermined duration when an input pulse is transmitted to its input by OR gate 218.

The output of the SINGLE SHOT circuit 220 is the qualified raw data made available to the electronic components of the disk drive, including those components that process servo dibits such as AM and Gray code dibits. Signal a depicted in FIG. 5 includes a false positive peak, as sometimes occurs during the operation of the disk drive. The above described prior art qualification circuit 200 will qualify the false peak since its amplitude exceeds $+V_{TH}$ and the slope of signal a changes from positive to negative at the false peak. The SINGLE SHOT circuit 220 will therefore output a raw data pulse that would be erroneously processed by the servo electronics in a servo timing or track number determination operation.

Figure 6:
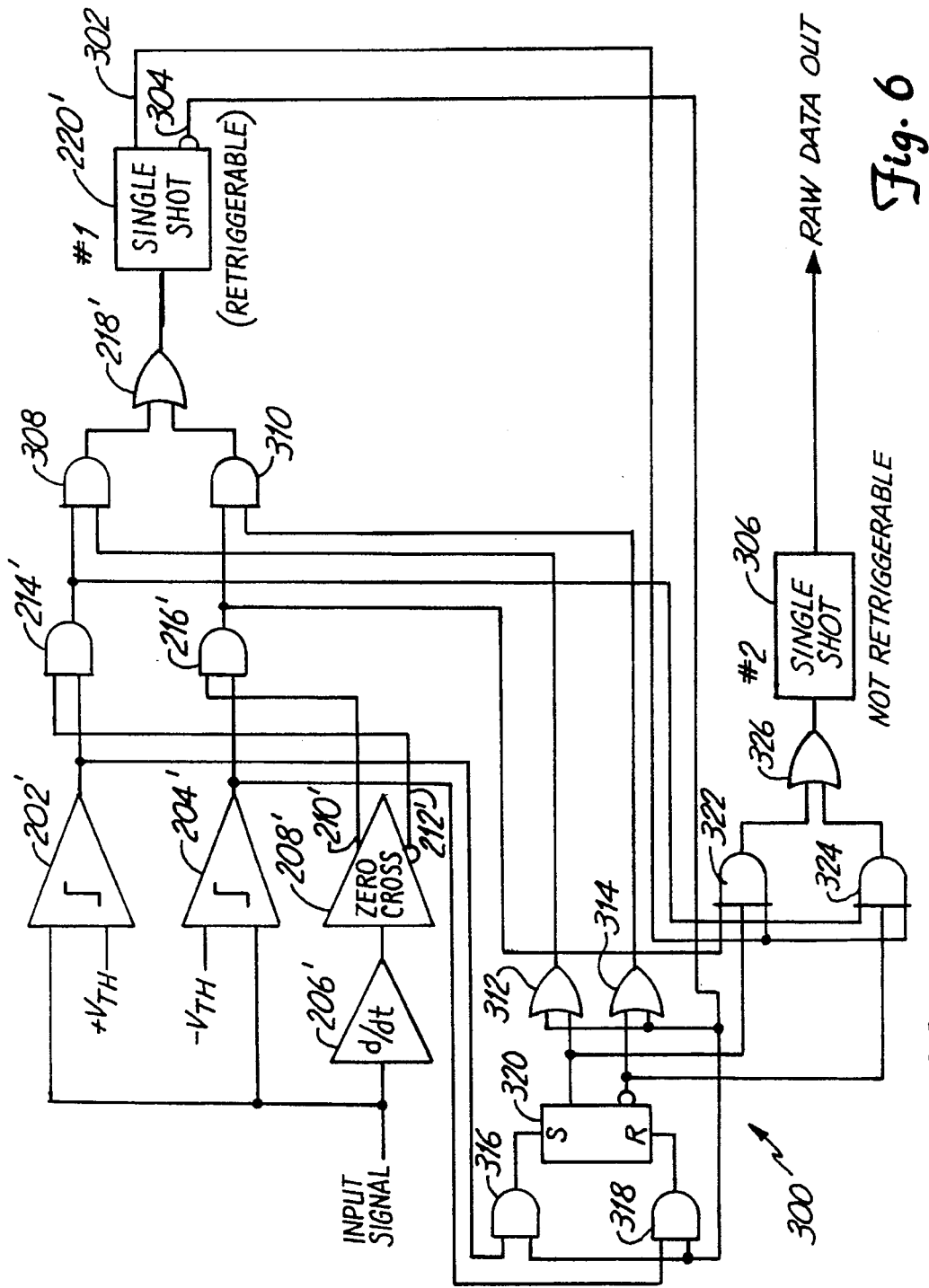
FIG. 6 is block diagram of a pulse qualification circuit according to the present invention, in the read/write control of FIG. 2.

Pursuant to the present invention, the prior art qualification circuit is modified to add logic that, in addition to determining satisfaction of conditions of amplitude and peak, adds conditions that qualify each peak pulse as one of a pair of peaks corresponding to a servo dibit. Referring now to FIG. 6, a qualification circuit 300 according to the present invention is shown. The qualification circuit 300 includes all of the components of the prior art circuit 200, indicated by like reference numerals, modified by a prime symbol "'", for convenience. Thus, the circuit 300 has threshold voltage comparators 202' and 204' to qualify amplitudes relative to $+V_{TH}$ or $-V_{TH}$ reference voltages, a differentiator 206' and zero cross circuit 208' to determine peaks, AND gates 214' and 216' as logic to pass only signal peaks that exceed threshold values and OR gate 218' and SINGLE SHOT circuit 220' to output raw data qualified in respect of amplitude and peak conditions for each single peak.

In accordance with the present invention, the SINGLE SHOT 220' is configured as a retriggerable circuit having an output 302 and a negated output 304. The outputs 302, 304 of the SINGLE SHOT 220' are used, respectively, as enable signals for a second SINGLE SHOT circuit 306, and a logic circuit comprising AND gates 308, 310, OR gates 312, 314, AND gates 316, 318, and FLIP/FLOP circuit 320.

The output 302 of the SINGLE SHOT 220' enables the SINGLE SHOT 306 via a logic circuit comprising AND gates 322, 324 and OR gate 326. To that end, the output 302 is coupled to an input of each of the AND gates 322, 324. In addition, the output of AND gate 214' is coupled to a second input of AND gate 324 and the output of AND gate 216' is coupled to a second input of AND gate 322.

An output of the FLIP/FLOP circuit 320 is coupled to a third input of AND gate 322, and a negated output of the FLIP/FLOP circuit 320 is coupled to a third input of AND gate 324. Accordingly, three conditions must be meet before either of AND gate 322 or AND gate 324 provides an output, as will appear. As shown in FIG. 6, the output of each of AND gate 322 and AND gate 324 is coupled to a respective input of OR gate 326.

An output of OR gate 326 is coupled to an input of the second SINGLE SHOT circuit 306. The second SINGLE SHOT circuit 306 is configured as a non-retriggerable circuit having an output used to transmit qualified raw data to the electronic components of the disk drive when the conditions for either of AND gate 322 or AND gate 324 are met, as will be described in detail below.

AND gates 308 and 310 impose a further condition on the triggering of the SINGLE SHOT 220' when single peaks are detected by amplifiers 202', 204' and zero cross circuit 208'. As in the prior art qualification circuit, AND gate 214' provides an output pulse when the amplitude of the input signal exceeds $+V_{TH}$, as detected by the amplifier 202', and the zero cross circuit 208' indicates a change in slope from positive to negative. AND gate 216' provides an output pulse when the amplitude of the input signal exceeds $-V_{TH}$, as detected by the amplifier 204', and the zero cross circuit 208' indicates a change in slope from negative to positive.

The output of AND gate 214' is coupled to an input of AND gate 308. A second input of AND gate 308 is coupled to an output of OR gate 312. OR gate 312 receives as inputs the negated output 304 of the SINGLE SHOT 220' and the output of the FLIP/FLOP circuit 320. Thus, the output of AND gate 214' is passed to the input of the OR gate 218' by AND gate 308 only when either of the negated output 304 of the SINGLE SHOT 220' or the output of the FLIP/FLOP circuit 320 is asserted.

A similar arrangement is provided for AND gate 216' via AND gate 310 and OR gate 314, except that the negated output of the FLIP/FLOP circuit 320 is coupled to the OR gate 314 rather than the output of the FLIP/FLOP circuit 320. Accordingly, the output of AND gate 216' is passed to the input of the OR gate 218' by AND gate 310 only when either of the negated output 304 of the SINGLE SHOT 220' or the negated output of the FLIP/FLOP circuit 320 is asserted.

When either of the AND gates 308, 310 provides an output pulse to OR gate 218', OR gate 218' passes the pulse to the input of the SINGLE SHOT 220'. As in the prior art qualification circuit 200, when an input is provided to the SINGLE SHOT 220', the SINGLE SHOT 220' outputs a pulse of predetermined duration at output 302. The duration of the pulse can be approximately twice the peak spacing of the dibit or more. The pulse output by the SINGLE SHOT 220' at output 302 enables the AND gates 322 and 324, subject to pulse signals applied to the other two inputs of one or the other of the AND gates 322 and 324, as described above. The negated output 304 is low whenever there is a pulse at the output 302, and is asserted high as a pulse at all other times. The pulse output at the negated output 304 enables the AND gates 308, 310, as described above, and further enables the AND gates 316 and 318, as shown in FIG. 6.

In view of the above discussion, it should be understood that a pulse asserted at the output 302 can correspond to the qualification of either a single negative or positive peak when the negated output 304 is initially asserted as a pulse (i.e. the case of triggering the SINGLE SHOT 220' by the output of either one of AND gates 214' or 216' via AND gates 308 or 310, respectively, when the SINGLE SHOT 220' has not been triggered by a previous peak, such that the AND gates 308 and 310 are both enabled by the negated output 304 of the SINGLE SHOT 220' via OR gates 312, 314, respectively). In this case, no signal will be passed to the remaining circuitry of the disk drive since the SINGLE SHOT 220' has not yet enabled either of the AND gates 322 and 324 used to trigger the second SINGLE SHOT 306.

When a next peak is detected by either one of AND gates 214' or 216', after the SINGLE SHOT 220' has been triggered by a previous peak detected by one of the AND gates 214' or 216', and during the period the SINGLE SHOT 220' remains triggered due to the previous peak, the negated output 304 will be low, and neither of the AND gates 308 and 310 will be enabled by the negated output 304 via the OR gates 312 and 314, respectively. In this case, the FLIP/FLOP circuit 320 is used to impose a condition that the triggered SINGLE SHOT 220' can only be retriggered by a subsequent peak of the same polarity as the peak that originally triggered the SINGLE SHOT 220'. Thus, e.g., if a positive peak first triggers the SINGLE SHOT 220', only a subsequent positive peak can retrigger the SINGLE SHOT 220'.

As noted above, prior to the triggering of the SINGLE SHOT 220', the negated output 304 is asserted high and thereby enables each of the AND gates 308, 310 via OR gates 312, 314 so that either a positive or negative peak can cause a triggering of the SINGLE SHOT 220'. As shown in FIG. 6, the output of the amplifier 202' is coupled to an input of AND gate 316, and the output of the amplifier 204' is coupled to an input of AND gate 318. When negated output 304 is asserted high and either of the amplifiers 202' or 204' provides an output due to the amplitude of the input signal exceeding one or the other of the $+V_{TH}$ and $-V_{TH}$ voltage values, a corresponding one of the AND gates 316, 318 will pass an output pulse to the FLIP/FLOP circuit 320.

In the case of the input signal exceeding the $+V_{TH}$ voltage, the assertion of the negated output 304 together with an output from amplifier 202' causes AND gate 316 to pass a pulse to the SET input of the FLIP/FLOP circuit 320. When set, the output of the FLIP/FLOP circuit 320 asserts a pulse at the input of the OR gate 312, to thereafter and until reset, enable AND gate 308 regardless of whether AND gate 308 is enabled by the negated output 304 of the SINGLE SHOT 220' via OR gate 312. When AND gate 308 is enabled by the set FLIP/FLOP circuit 320, a next positive peak detected by the amplifier 202' and zero cross circuit 208' can retrigger the SINGLE SHOT 220' via OR gate 312, AND gate 308 and OR gate 218'. When set, the negated output of the FLIP/FLOP circuit 320 is low. Therefore, AND gate 310 is not enabled by the FLIP/FLOP circuit 320, and a negative peak cannot retrigger the SINGLE SHOT 220' as long as the SINGLE SHOT 220' remains triggered and the negated output 304 is low.

In the case of the input signal exceeding the $-V_{TH}$ voltage, the assertion of the negated output 304 together with an output from amplifier 204' causes AND gate 318 to pass a pulse to the RESET input of the FLIP/FLOP circuit 320. When reset, the negated output of the FLIP/FLOP circuit 320 asserts a pulse at the input of the OR gate 314, to thereafter and until once again set, enable AND gate 310 regardless of whether AND gate 310 is enabled by the negated output 304 of the SINGLE SHOT 220' via OR gate 314. When AND gate 310 is enabled by the reset FLIP/FLOP circuit 320, a next negative peak detected by the amplifier 202' and zero cross circuit 208' can retrigger the SINGLE SHOT 220' via OR gate 314, AND gate 310 and OR gate 218'. Similar to the above case, AND gate 308 is not enabled while the SINGLE SHOT 220' is triggered and the FLIP/FLOP circuit 320 is reset, and a positive peak cannot retrigger the SINGLE SHOT 220'.

In addition, as shown in FIG. 6, and as described above, the output of the FLIP/FLOP circuit 320 is coupled to an input of AND gate 322 and the negated output of the FLIP/FLOP circuit 320 is coupled to an input of AND gate 324. This arrangement is used to synchronize the operation of the circuit 300 regardless of whether the dibit is written as a positive peak followed by a negative peak or vice versa. In conventional disk drives, an inductive head is used to both write and read data. Under such circumstances, it is possible to control recording such that each dibit always comprises a first peak of a certain polarity, followed by the opposite polarity.

However, it is expected that more advanced drives will utilize magnetoresistive heads that include a magnetoresistive element to read data and a separate inductive coil to write data. In such arrangements, the initial polarity of a dibit arrangement may not be known. Thus, the exemplary embodiment of the present invention utilizes the FLIP/FLOP circuit 320 to initialize the circuit 300 regardless of which polarity is first encountered, and require the next peak to be of an opposite polarity. If implemented in a disk drive where the first polarity is always known, the FLIP/FLOP circuit 320 can be eliminated and one of the amplifiers 202' and 204' alone (the amplifier corresponding to the known initial polarity) is coupled to the first SINGLE SHOT 220'. The output of the other amplifier is coupled to the second SINGLE SHOT 306. As noted above, the FLIP/FLOP circuit 320 synchronizes the circuit 300 by imposing the condition that once the FLIP/FLOP 320 is either initially set or reset by a positive or negative peak, respectively, the next peak must be of opposite polarity to the previous peak in order to trigger the SINGLE SHOT 306 via the respective one of the AND gates 322 and 324, and OR gate 326, as will now be explained.

Figure 7:
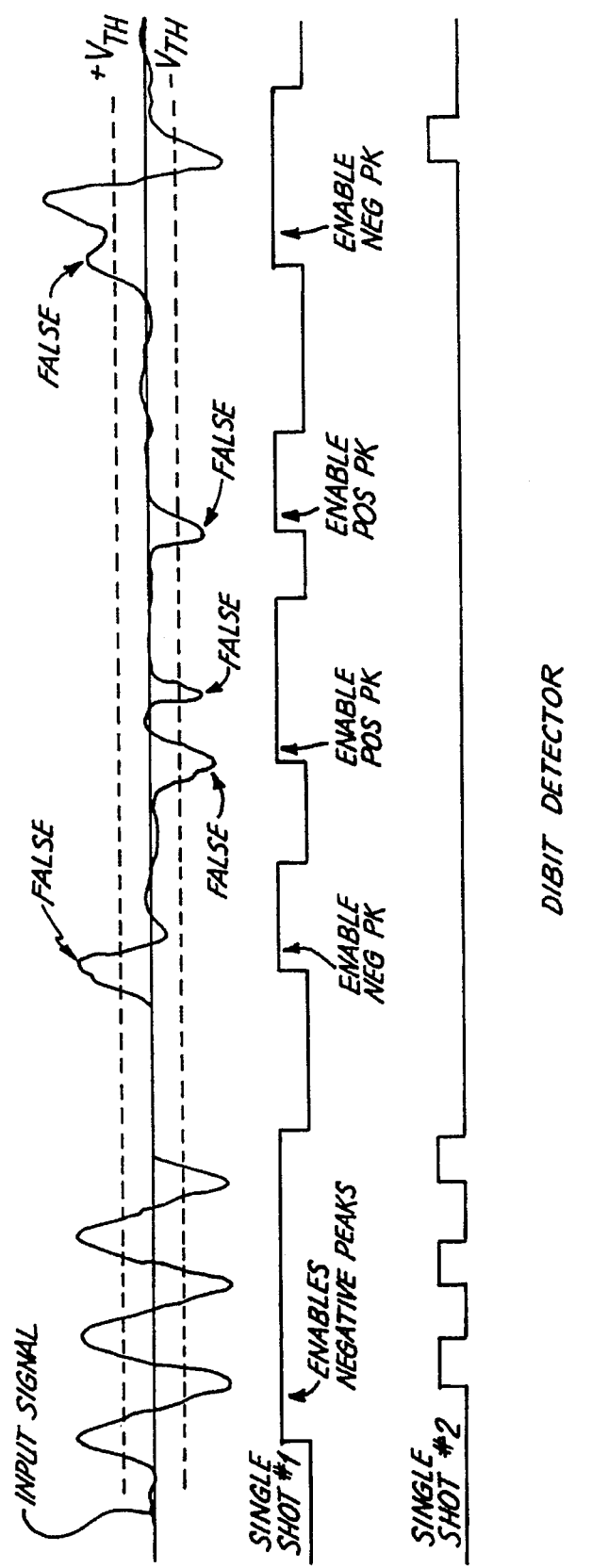
FIG. 7 is a timing diagram illustrating signals relevant to the operation of the pulse qualification circuit of FIG. 6.

Referring to FIG. 7, there is shown a timing diagram illustrating signals relevant to the operation of the pulse qualification circuit of FIG. 6. An INPUT signal, shown at the top of FIG. 7, represents another example of a transduction-derived signal having a waveform of a type that could be transduced by a head 24a–h, when the head 24a–h is over either an AM or Gray code field. The next two signals represent the outputs obtained at each of the SINGLE SHOT 220' and the SINGLE SHOT 306 when the INPUT signal is processed by the qualification circuit 300 of the present invention. The INPUT signal shows an exaggerated number of false single peaks, both positive and negative, to illustrate the operation of the qualification circuit.

During the operation of the qualification circuit 300, starting at the left of the INPUT signal, the amplitude of the signal is flat until a first dibit is transduced from a disk surface. At the first dibit, the amplitude steadily increases. At the point where the amplitude exceeds the amplitude of the $+V_{TH}$ voltage, the amplifier 202' outputs a pulse to an input of AND gate 214'. The output of the amplifier 202' is also coupled to an input of AND gate 316. Since the INPUT signal is approaching a first peak, the SINGLE SHOT 220' will not have been triggered, and the negated output 304 of the SINGLE SHOT 220' will be asserted to enable AND gate 316. Thus, when the output of the amplifier 202' is received at AND gate 316, the AND gate 316 will output a pulse to the SET input of the FLIP/FLOP circuit 320. When set, the output of the FLIP/FLOP circuit 320 enables AND gate 308 via OR gate 312, and enables AND gate 322.

When the INPUT signal reaches a maximum amplitude and then begins to decrease in amplitude, the negated output 212' of the zero cross circuit 208' will go high to enable AND gate 214'. At this point, each input (amplifier 202' and negated output of zero cross circuit 208') to AND gate 214' is asserted high, causing a pulse from AND gate 214' to be asserted and input to AND gate 308. Since the INPUT signal is approaching a first peak, as noted above, the negated output 304 of the SINGLE SHOT 220' is asserted to also enable AND gate 308 via OR gate 312. Thus, when AND gate 214' asserts a pulse, AND gate 308 will pass a pulse to the input of OR gate 218', which, in turn, triggers the SINGLE SHOT 220', as shown by the rise in SINGLE SHOT #1 signal in FIG. 7.

Once triggered, the output 302 of the SINGLE SHOT 220' goes high to enable each of the AND gates 322 and 324, and the negated output 304 goes low such that the negated output 304 no longer enables the AND gates 308, 310 via OR gates 312, 314, or the AND gates 316 and 318. The circuit 300 remains in this state until a next peak is detected or the period that the SINGLE SHOT 220' remains asserted expires. To review, neither AND gates 316 or 318 are now enabled by the negated output 304. Accordingly, the FLIP/FLOP circuit 320 cannot be set or reset while the SINGLE SHOT 220' remains triggered. Moreover, AND gate 322 is now enabled by both the output 302 of the SINGLE SHOT 220' and the output of the now set FLIP/FLOP circuit 320. AND gate 324 is only enabled by the output 302 of the SINGLE SHOT 220', since the negated output of the FLIP/FLOP circuit 320 is low due to the setting of the FLIP/FLOP circuit 320 by the output of the amplifier 202', asserted when the amplitude of the INPUT signal first exceeded the $+V_{TH}$ voltage.

Thus, at this point, two of the conditions for enabling AND gate 322 are in place (output 302 caused by the triggering of the SINGLE SHOT 220' by the first positive peak, and the set state of the FLIP/FLOP circuit 320, also caused by the first positive peak), while only one of the conditions for enabling AND gate 324 is in place (output 302, the second condition is not met since the negated output of the FLIP/FLOP circuit 320 is not asserted).

As described above, the third input for AND gate 322 is the output of AND gate 216', which is only asserted when a negative peak is detected via the simultaneous output of the amplifier 204' and the output 210' of the zero cross circuit 208'. Accordingly, the SINGLE SHOT 306 can now only be triggered via AND gate 322 and OR gate 326. This can only occur when a negative peak is detected and qualified by the amplifier 204' and zero cross circuit 208', as required for a qualified dibit. For this reason the high signal for the SINGLE SHOT #1 shown in FIG. 7 is labeled "enable negative peak."

Returning to the INPUT signal, after the positive peak, the signal continuously decreases to the negative peak of the illustrated dibit. When the signal reaches an amplitude that exceeds $-V_{TH}$, the amplifier 204' provides an output pulse to each of AND gate 318 and AND gate 216'. The assertion of a pulse at the input of AND gate 318 has no effect, since the negated output 304 is not asserted due to the triggered state of the SINGLE SHOT 220'. When the INPUT signal reaches the negative peak, the output 210' of the zero cross circuit 208' is asserted to enable AND gate 216'. This has no effect on the SINGLE SHOT 220', since AND gate 310 is not enabled via OR gate 314 by either the negated output 304 (now low since triggering of the SINGLE SHOT 220' by the first positive peak) or the negated output of the FLIP/FLOP circuit 320 (now low since the FLIP/FLOP circuit 320 was set by the first positive peak).

However, the output of AND gate 216' is coupled to an input of AND gate 322, and the assertion of a pulse by AND gate 216', upon a negative peak, satisfies the last condition required to enable AND gate 322. Once fully enabled at the negative peak by all three inputs being asserted high (AND gate 216' by the negative peak, the output of the FLIP/FLOP circuit 320 set by the first positive peak and the output 302 of the SINGLE SHOT 220' caused by the triggering of the SINGLE SHOT 220' by the first positive peak), AND gate 322 triggers the SINGLE SHOT 306 via OR gate 326, as shown by the rise in SINGLE SHOT #2 signal in FIG. 7, at the negative peak of the first dibit. The output of the SINGLE SHOT 306 comprises a pulse of predetermined duration that represents detection and qualification of the first dibit.

If the period the SINGLE SHOT 220' remains high after being triggered is set at twice the peak spacing, the SINGLE SHOT 220' will continue in the triggered state after the negative peak of the first dibit shown in the INPUT signal. Continuing with the description of the INPUT signal, after the negative peak of the first dibit, the signal begins to increase in amplitude toward the positive peak of the next dibit. When the amplitude exceeds the $+V_{TH}$ voltage, the amplifier 202' once again asserts an output pulse. This pulse has no effect upon AND gate 316 since AND gate 316 is not enabled by the still low negated output 304. Accordingly, the FLIP/FLOP circuit 320 remains set. The output pulse of the amplifier 202' is also input to AND gate 214'.

At the positive peak of the second dibit, the negated output 212' of the zero cross circuit 208' asserts a pulse applied to AND gate 214' to then enable an output pulse from AND gate 214' that is applied to each of AND gate 308 and AND gate 324. Since the FLIP/FLOP circuit 320 is set, the negated output of the FLIP/FLOP circuit 320 will be low, such that the application of the pulse output from AND gate 214' has no effect upon AND gate 324, and the SINGLE SHOT 306 is not triggered. However, AND gate 308 is enabled by the output of the set FLIP/FLOP circuit 320 via OR gate 312, and the output pulse from AND gate 214' is therefore passed by AND gate 308 to OR gate 218', which, in turn, retriggers the SINGLE SHOT 220'.

As the signal proceeds to the negative peak of the second dibit, the qualification circuit 300 operates as described above for the negative peak of the first dibit, to again trigger the SINGLE SHOT 306, as shown by the rise in SINGLE SHOT #2 at the negative peak of the second dibit in FIG. 7. The third dibit shown in the INPUT signal will cause another retriggering of the SINGLE SHOT 220' by the positive peak of the third dibit to keep SINGLE SHOT #1 at the enable negative peak state shown in FIG. 7, and a subsequent third triggering of SINGLE SHOT 306 by the negative peak of the third dibit, shown as a third pulse in SINGLE SHOT #2 in FIG. 7, both in operations of the qualification circuit 300 that are similar to its operation during the processing of the first dibit.

After the third dibit of the INPUT signal, the signal falls to a zero state, indicating that there are no signals being transduced by a head at this time. As shown in FIG. 7, after the trigger period for the SINGLE SHOT 220' expires, SINGLE SHOT #1 falls to a low value. At this point, the negated output 304 of the SINGLE SHOT 220' is again asserted high to enable the AND gates 308, 310 via OR gates 312, 314, and AND gates 316 and 318. Accordingly, either a positive or negative peak can trigger the SINGLE SHOT 220' or set or reset the FLIP/FLOP circuit 320.

Somewhat past the third dibit, the INPUT signal is shown as encountering a false positive peak. As in the case of the positive peak of the first dibit, the false positive peak sets the FLIP/FLOP circuit 320 and triggers the SINGLE SHOT 220'. The triggering of the SINGLE SHOT 220' and the setting of the FLIP/FLOP circuit 320 enables the second SINGLE SHOT 306 for triggering by a subsequent negative peak, as required to qualify a dibit. Since the positive peak is a false peak, there is no subsequent negative peak, and the SINGLE SHOT 220' eventually goes low without any signal being passed to the remaining circuits of the disk drive.

Continuing the analysis of the INPUT signal, after the false positive peak, the signal shows a false negative peak. The amplifier 204' outputs a pulse as soon as the false negative amplitude exceeds the $-V_{TH}$ voltage. The output pulse is applied to inputs of the AND gates 216' and 318. Since the SINGLE SHOT 220' has past the triggered period from the false positive peak, the negated output 304 will be asserted to enable AND gate 318 and AND gate 310 via OR gate 314. Accordingly, the output from the amplifier 204' applied to AND gate 318 causes AND gate 318 to reset the FLIP/FLOP circuit 320.

At that time, the negated output of the FLIP/FLOP circuit 320 goes high to enable AND gate 324 and AND gate 310 via OR gate 314. Once the negative amplitude reaches its peak value, the output 210' of the zero cross circuit 208' is asserted to enable AND gate 216' to thereby pass the output pulse from the amplifier 204' to AND gate 310. As AND gate 310 is enabled by the negated output of the SINGLE SHOT 220', the pulse is passed via OR gate 218' to trigger the SINGLE SHOT 220'.

With the triggering of the SINGLE SHOT 220', the output 302 enables AND gate 324. The resetting of the FLIP/FLOP circuit 320 also causes the negated output of the FLIP/FLOP circuit 320 to enable AND gate 324. The remaining input to AND gate 324 is the output of AND gate 214'. As described above, AND gate 214' can only be enabled by a positive peak detected by the amplifier 202' and the negated output 212' of the zero cross circuit 208'. Thus, the triggered SINGLE SHOT 220' is labeled in FIG. 7 as being in an "enable positive peak" state.

However, as shown in FIG. 7, the next peak is another false negative peak. This false negative peak can only retrigger the SINGLE SHOT 220' via AND gates 216' and 310 (which is enabled via OR gate 314 by the negated output of the reset FLIP/FLOP circuit 320). The output of AND gate 216' is coupled to AND gate 322, which is enabled by the output 302 of the triggered SINGLE SHOT 220', but is not enabled by the now reset FLIP/FLOP circuit 320. Thus, AND gate 322 cannot operate to trigger the SINGLE SHOT 306, and, again, no signal is passed to the remaining circuits of the disk drive by the SINGLE SHOT 306.

A third false negative peak is shown in the INPUT signal of FIG. 7, past the retriggered state of the SINGLE SHOT 220'. This peak will trigger the SINGLE SHOT 220' and reset the FLIP/FLOP circuit 320. However, since no peak follows the false negative peak within the trigger period of the SINGLE SHOT 220', the output 320 of the SINGLE SHOT 220' is asserted for its period and then falls low, as shown below the third false negative peak in FIG. 7. Again, no signal is passed to the remaining circuits of the disk drive.

Finally, in the example of the INPUT signal shown in FIG. 7, a dibit including an initial false positive peak is depicted. The initial false positive peak will trigger the SINGLE SHOT 220' and set the FLIP/FLOP circuit 320, as described above. The true positive peak acts to retrigger the SINGLE SHOT 220' to thereby continue the enable state for AND gate 322. AND gate 322 will trigger the SINGLE SHOT 306 when a signal is output by AND gate 216' upon detection and qualification of the negative peak by the amplifier 204' and zero cross circuit 208'.

Accordingly, the exemplary qualification circuit 300 of the present invention separately qualifies each dibit and does not pass any single peaks caused by noise to the remaining circuits of the disk drive. In this manner, a more accurate reading of servo dibits is achieved, and full advantage is taken of the distinction between a dibit and a single peak when detecting and qualifying signals derived from dibit transitions recorded on a disk surface.

I claim:

1. A circuit to detect and qualify a dibit signal, the dibit signal including a first peak amplitude followed by a second peak amplitude, the circuit comprising:

a first qualification circuit comprising a positive peak amplitude detector and a negative peak amplitude detector each receiving the signal, and a first SINGLE SHOT circuit coupled to each of the positive peak and negative peak amplitude detectors, the first SINGLE SHOT circuit being responsive to detection of a peak amplitude by one of the positive peak and negative peak amplitude detectors to assert an enable signal; and a second qualification circuit coupled to the first qualification circuit comprising a second SINGLE SHOT circuit and a first AND gate and a second AND gate, the enable signal being coupled to a first input of each of the first and second AND gates, and the positive peak and negative peak amplitude detectors each being coupled to a second input of a respective one of the first and second AND gates, each of the AND gates having an output coupled to the second SINGLE SHOT to operate the second SINGLE SHOT circuit to output a signal representative of the dibit signal.

2. The circuit of claim 1 further comprising an OR gate coupling the first and second AND gates to the second SINGLE SHOT.

3. The circuit of claim 1 further comprising a FLIP/FLOP circuit coupled to each of the positive peak and negative peak amplitude detectors, and having an output coupled to one of the first and second AND gates and a negated output coupled to the other of the first and second AND gates, so that when a first peak amplitude of the dibit signal is detected by one of the positive peak and negative peak amplitude detectors, the FLIP/FLOP circuit is set or reset as a function of the polarity (positive or negative) of the first peak amplitude, to enable only one of the first and second AND gates, the one AND gate enabled by the FLIP/FLOP being coupled to the other of the positive peak or negative peak amplitude detectors operating to detect a peak amplitude having a polarity (positive or negative) opposite to the polarity of the first peak amplitude.

4. The circuit of claim 3 further comprising a FLIP/FLOP logic circuit coupling the FLIP/FLOP circuit to the positive and negative peak amplitude detectors, and being coupled to the first SINGLE SHOT to impose a condition that the FLIP/FLOP circuit can only be set or reset by one of the positive and negative peak amplitude detectors prior to the first SINGLE SHOT asserting the enable signal.

5. The circuit of claim 3 further comprising a first SINGLE SHOT logic circuit coupling the FLIP/FLOP circuit to the first SINGLE SHOT, and being coupled to the first SINGLE SHOT to impose a condition that the first SINGLE SHOT can only be activated after asserting the enable signal by a subsequent peak amplitude having a same polarity (positive or negative) as the first peak amplitude.

6. The circuit of claim 3 further comprising a second SINGLE SHOT logic circuit coupling the FLIP/FLOP circuit to the second SINGLE SHOT, and being coupled to the first SINGLE SHOT to impose a condition that the second SINGLE SHOT can only be activated, after the first SINGLE SHOT asserts the enable signal, by a subsequent peak amplitude having a different polarity (positive or negative) as the first peak amplitude.

7. The circuit of claim 1 wherein the first SINGLE SHOT circuit is retriggerable to assert the enable signal by one of the positive peak and negative peak amplitude detectors detecting a peak amplitude.

8. The circuit of claim 7 wherein the first SINGLE SHOT is reset to de-assert the enable signal after a time period greater than the expected duration between successive peaks of a dibit signal.

9. The circuit of claim 8 wherein the first SINGLE SHOT is retriggerable during the time period only by the one of the positive peak and negative peak amplitude detectors that triggered the SINGLE SHOT.

10. The circuit of claim 1 wherein the first SINGLE SHOT is reset to de-assert the enable signal after a time period greater than the expected duration between successive peaks of a dibit signal.

11. A method of qualifying a dibit signal, the dibit signal including a first peak amplitude followed by a second peak amplitude, the first and second peak amplitudes having opposite polarities, the method comprising the steps of:

detecting and qualifying the first peak amplitude;

using the qualification of the first peak amplitude to establish an enable condition to enable the detection and qualification of the second peak amplitude;

detecting and qualifying the second peak amplitude only upon an enable condition; and providing an indication of the dibit signal only upon qualifying the second peak amplitude.

12. The method of claim 11 comprising the further step of sensing the polarity of the first peak amplitude (positive or negative) and using the sensed polarity as a condition that the second peak amplitude is qualified only when its polarity is opposite to the polarity of the first peak amplitude.

13. The method of claim 11 including removing the enable condition upon expiration of a predetermined time period following establishing the enable condition, the time period being at least as great as twice the expected duration between successive peaks of a dibit signal.

14. The method of claim 13 further comprising sensing the polarity of the first peak amplitude and restarting the time period upon each qualification of a peak amplitude having the same polarity as the first peak amplitude occurring during the enable condition.

15. A circuit to detect and qualify a dibit signal, the dibit signal including first and second successive peak amplitudes having opposite polarities, the circuit comprising:

a positive peak amplitude detector receiving the signal to detect a positive peak amplitude in the signal;

a negative peak amplitude detector receiving the signal to detect a negative peak amplitude in the signal;

a first qualification circuit coupled to each of the positive peak and negative peak amplitude detectors and responsive to a first detection of a peak amplitude by one of the positive peak and negative peak amplitude detectors to assert an enable signal; and a second qualification circuit coupled to each of the positive peak and negative peak amplitude detectors and to the first qualification circuit, the second qualification circuit being responsive to the enable signal and to a second detection of a peak amplitude by one of the positive peak and negative peak amplitude detectors to output an output signal representative of the dibit signal only when the second detection of a peak amplitude is of a peak amplitude that is opposite in polarity to the peak amplitude that caused the first qualification circuit to assert the enable signal and the second detection occurs during the enable signal.

16. The circuit of claim 15 further comprising a logic circuit coupled to each of the positive peak and negative peak amplitude detectors to operate the first qualification circuit to assert the enable signal as a function of the polarity of peak amplitudes detected by one of the positive peak and negative peak amplitude detectors, the second qualification circuit being responsive to the enable signal and detection of a peak amplitude by the other of the positive and negative peak amplitude detectors.

17. The circuit of claim 15 wherein the first qualification circuit is reset to de-assert the enable signal after a predetermined time period following a triggering in response to detection of a peak amplitude, the time period being at least as great as twice the expected duration between successive peaks of a dibit signal.

18. The circuit of claim 17 further comprising a logic circuit coupled to each of the positive peak and negative peak amplitude detectors to retrigger the first qualification circuit in response to successive peak amplitudes within the predetermined time period detected by one of the positive peak and negative peak amplitude detectors.

* * * * *